(12) United States Patent
Chen et al.

(10) Patent No.: US 10,847,098 B2
(45) Date of Patent: Nov. 24, 2020

(54) METHOD AND APPARATUS FOR REGIONAL LIQUID CRYSTAL DISPLAY BACK LIGHT UNIT DIMMING USING ELECTROCHROMIC MATERIAL

(71) Applicant: Dell Products, LP, Round Rock, TX (US)

(72) Inventors: Ching-Feng Chen, New Taipei (TW); Meng-Feng Hung, Taoyuan (TW); Yi Fan Wang, Taipei (TW); Tsung-Chin Cheng, Taoyuan (TW); Pavel Sergei Olchovik, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 29 days.

(21) Appl. No.: 16/146,853

(22) Filed: Sep. 28, 2018

(65) Prior Publication Data
US 2020/0103717 A1 Apr. 2, 2020

(51) Int. Cl.
*G09G 3/34* (2006.01)
*G02F 1/15* (2019.01)

(52) U.S. Cl.
CPC ............. *G09G 3/3426* (2013.01); *G02F 1/15* (2013.01); *G09G 3/3433* (2013.01); *G09G 2320/066* (2013.01); *G09G 2320/0626* (2013.01); *G09G 2320/0686* (2013.01)

(58) Field of Classification Search
CPC ................. G02F 1/15; G02F 1/133605; G02F 1/133603; G09G 3/3426; G09G 2320/066; G09G 2320/0626; G09G 3/3433; G09G 2320/0686; G09G 2300/04; G02B 6/0011

See application file for complete search history.

(56) References Cited

U.S. PATENT DOCUMENTS

| 2014/0146271 | A1* | 5/2014 | Hung | ................... | G02B 6/0011 |
| | | | | | 349/62 |
| 2015/0192835 | A1* | 7/2015 | Kim | ..................... | G09G 3/3208 |
| | | | | | 345/589 |
| 2015/0277164 | A1* | 10/2015 | Nagase | ............. | G02F 1/133536 |
| | | | | | 349/33 |
| 2016/0195772 | A1* | 7/2016 | Lee | ................... | G02F 1/133611 |
| | | | | | 349/61 |

(Continued)

*Primary Examiner* — Jonathan A Boyd
(74) *Attorney, Agent, or Firm* — Prol Intellectual Property Law, PLLC; H. Kenneth Prol

(57) ABSTRACT

An information handling system may comprise a liquid crystal display having a plurality of pixels, an electrochromic material layer having a plurality of electrodes disposed between an interior surface of a chassis and a transistor-array layer, and a high reflection layer reflecting light emitted from an LED disposed between the electrochromic material layer and the transistor-array layer away from the interior surface of the chassis. A processor may execute code instructions of an electrochromic material regional backlight unit dimming control system to identify a low-intensity pixel region including a subset of the plurality of pixels associated within high dynamic ratio image data with a low intensity value, identify an electrode of the electrochromic material layer associated with the low-intensity pixel region; and pass a current through the electrode such that a portion of the electrochromic material becomes opaque to the light reflected from the high reflection layer.

20 Claims, 10 Drawing Sheets

(56) References Cited

U.S. PATENT DOCUMENTS

| | | | |
|---|---|---|---|
| 2018/0286335 A1* | 10/2018 | Zhu | G02F 1/163 |
| 2019/0033649 A1* | 1/2019 | Okuyama | G02F 1/133553 |
| 2019/0080664 A1* | 3/2019 | Li | G09G 3/38 |

* cited by examiner

METHOD AND APPARATUS FOR REGIONAL LIQUID CRYSTAL DISPLAY BACK LIGHT UNIT DIMMING USING ELECTROCHROMIC MATERIAL

FIELD OF THE DISCLOSURE

The present disclosure generally relates to dimming reflective or transmitted light emitted by a back light unit of a liquid crystal display. The present disclosure more specifically relates to adaptively dimming such reflective or transmitted light in specific regions of a liquid crystal display using an electrochromic material.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a liquid crystal display having a back light unit.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
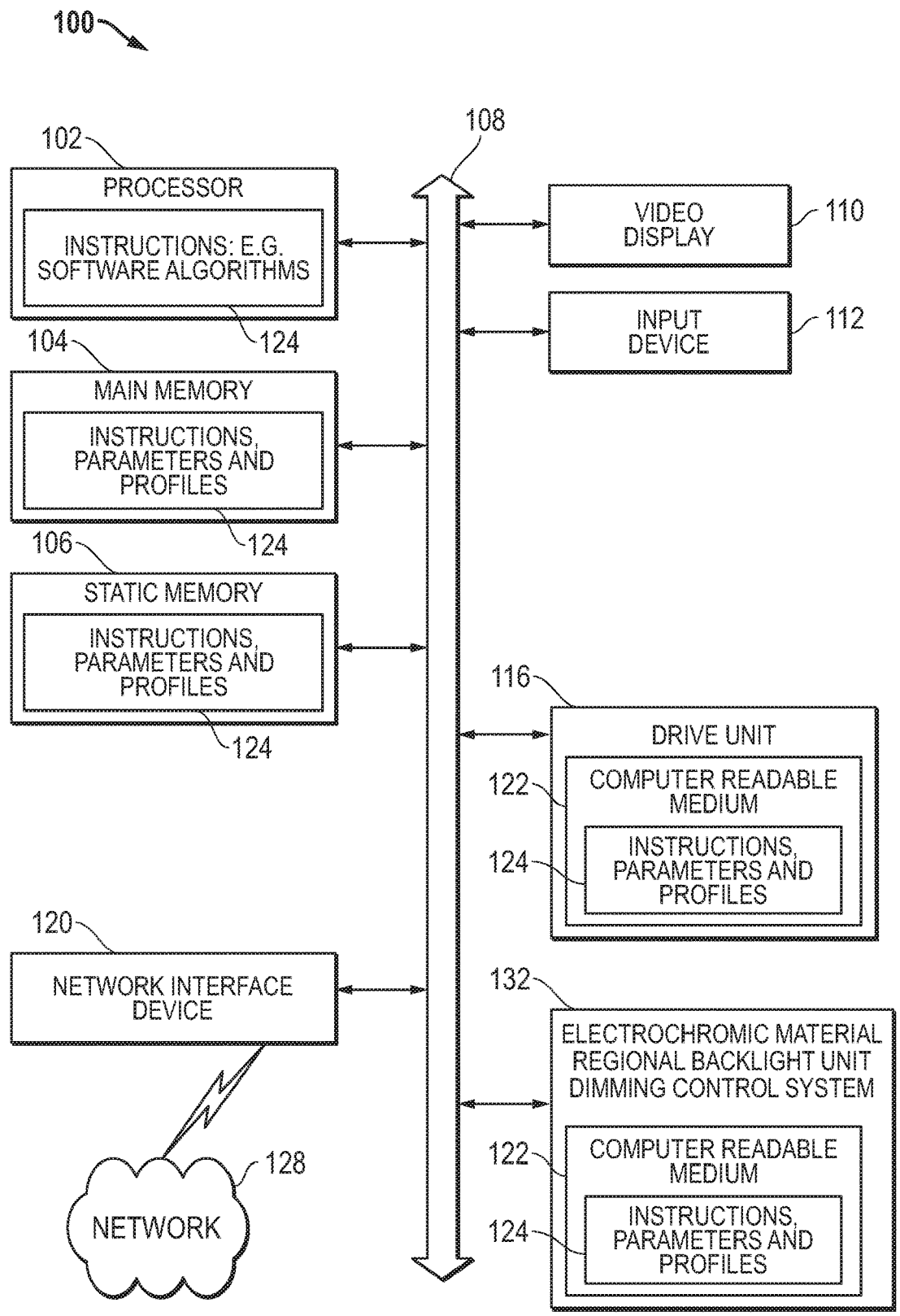
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An increasing number of display devices are being designed to support high dynamic range (HDR) video inputs capable of much greater resolution than previous video display standards. In order to meet the requirements of an HDR image, the image must be displayed at high contrast ratios. This means that there must be a large difference between the light emitted from pixels directed to display at the peak luminance of the video display and the light emitted from pixels directed to remain dark or black. For example, the Ultra High Definition (UHD) Alliance defines the standard for HDR video inputs to require a contrast ratio between the peak brightness and black level capabilities of a video display to be at least 20,000 to one for a video display having a peak brightness over 1,000 nits. As another example, the UHD Alliance defines the standard to require a contrast ratio between a peak brightness of 540 nits and a corresponding black level to be at least 1,080,000 to one. The black level for a display must remain very low in order to achieve these required contrasts.

Many video displays, such as liquid crystal displays (LCDs) employ a backlight unit in order to project light through a plurality of pixels to produce an image. Such an LCD display in embodiments described herein may be placed within a chassis of an information handling system such as a laptop computer. In such embodiments, the backlight unit for the LCD display may be placed between the LCD display screen and the top exterior surface of the chassis (e.g. the lid of a clamshell laptop), and may include a plurality of light emitting diodes (LEDs) emitting light through a light guide plate and toward the LCD display screen. While the intent of such a backlight unit may be to emit light toward the LCD display screen, a portion of the light from the backlight unit may stray toward the top exterior surface of the chassis. In order to keep such stray light from being emitted through the top exterior surface of the chassis, the backlight unit in embodiments described herein may further include a reflector sheet placed between the LEDs and the top exterior surface of the chassis to reflect stray light back toward the LCD display screen and away from the top exterior surface of the chassis.

An LCD display in embodiments described herein may include a transistor layer, such as for example, a thin-film transistor that operates to turn each pixel of a display on or off. When placed in the off position, a pixel of an LCD display is meant to achieve the minimum black level of the LCD display. The ability to achieve this minimum black level is key to achieving the contrast required to meet the requirements for the HDR standards described above. However, the pixels of LCD displays often allow for some bleed-through of light, even when they are placed in the off state, due in part to the inadvertent reflection of stray light emitted from the LEDs of the backlight unit and reflected toward the LCD display screen.

One method of overcoming this problem, referred to herein as local dimming includes turning off one or more of the LEDs located nearby the pixels of the LCD display meant to display at the minimum black level. For example, in embodiments in which the backlight unit includes a plurality of LEDs situated in an array along the bottom edge of the light guide plate, turning off one of the LEDs in that array may allow pixels situated in a vertical column across the entirety of the LCD display to achieve a lower darkness value approaching the minimum black level of the display. However, such a method would impact the brightness of all pixels within a vertical strip of the LCD display. If the HDR image displayed by the LCD display includes some bright portions and some dark portions within this vertical strip, such a method could over-correct the brightness of pixels meant to emit bright light within the vertical strip. In such a case, dimming the entire vertical strip of the LCD display may increase the contrast of the image only marginally. A solution is needed that can adjust the brightness of more granular regions of the LCD display in order to maximize the contrast of the displayed image. In other words, a solution is needed to decrease light bleed-through on a region-by-region basis, where the regions of the LCD display are smaller than the vertical strips associated with the existing method.

One solution to this issue may include addition of further LEDs along more edges of the light guide plate or panel. For example, in embodiments in which the backlight unit includes a plurality of LEDs situated in an array along both the bottom edge and the top edge of the light guide plate, one of the LEDs in the bottom array could be turned off and the LED in the top array located directly above may be turned on. In such a way, the pixels situated near the bottom LED may achieve a lower darkness value while the pixels situated directly above, near the top LED could achieve higher brightness values. Although this solution may provide slightly more granularity to the regions of the LCD, further granularity could provide still greater contrast abilities. Further, the use of an extra array of LEDs may increase the weight, bulk, power draw, and cost of the backlight unit. A solution is needed that does not require the addition of LEDs.

Use of an electrochromic material to block light emitted through a plurality of smaller regions of an LCD display may address this issue in embodiments described herein. A layer of electrochromic material in embodiments may be placed between the LCD display screen and the reflector layer proximate to the interior of the top of the chassis. Types of electrochromic material that may be used in an embodiment may include metal oxides, such as tungsten oxide. In other embodiments, viologens may be used, or conducting polymers such as polpyrrole, poly 3,4-ethylene-dioxythiophene (PEDOT), or polyaniline may be used. In yet another embodiment, viologens may be used in conjunction with titanium dioxide.

Electrochromic material in embodiments may include a plurality of electrodes. An electrochromic material regional backlight unit dimming control system in embodiments may instruct the operation of each electrode. For example, the electrochromic material regional backlight unit dimming control system in embodiments may leave an electrode deactivated by not applying a current to it. A deactivated electrode may allow a portion of the electrochromic material in contact with the electrode to appear translucent (e.g. allowing light to pass straight through). As another example, the electrochromic material regional backlight unit dimming control system may activate an electrode by applying a current to it. An activated electrode in embodiments may allow a portion of the electrochromic material in contact with the electrode to appear opaque, thus disallowing light to pass through that portion of the electrochromic material.

Each electrode in an embodiment may be separately controlled in order to either allow or disallow the passage of light through various portions or regions of the electrochromic material. Thus, light may be either emitted or blocked on a region-by-region basis, where each region is roughly the size of an electrode. If a grid of electrodes is placed along the electrochromic material in embodiments, such that each vertical strip of the electrochromic material includes a plurality of individual electrodes, the system controlling each electrode may increase the contrast between a plurality of smaller, more granular regions of the LCD display. In such a way, the electrochromic material regional backlight unit dimming control system may decrease the light bleed-through of an LCD display on a region-by-region basis in order to increase the contrast between the peak brightness of the display and the minimum black level.

One solution employing an electrochromic material to provide regional dimming of an LCD display may include the use of a single electrode of the electrochromic material for each individual pixel of the LCD display. Such a solution may maximize contrast between pixels, but the maximizing of contrast may not be necessary in order to achieve the contrast required by the HDR image standards. In other words, a balance needs to be struck between the benefits of drawbacks of such a solution. For example, such a solution may also greatly increase the weight, bulk, and cost of the electrochromic material layer. Thus, such solutions are better suited for stationary displays such as wall-mounted televisions where bulk and weight may not be critical factors, rather than for mobile devices such as laptop and tablet computers where bulk and weight are critical factors. Further, in order to properly align each electrode with an individual pixel, the electrochromic material may need to lie in close contact with the front electrodes of the transistor layer. Thus, such solutions may include placement of the electrochromic material within the LCD panel, between the transistor layer and the LCD display screen, or top-most glass sheet (e.g. on the front side of the transistor layer). Placement of the electrochromic material within the LCD panel may further increase the complexity and cost of the system. A solution is needed that decreases the weight, bulk, and cost of the electrochromic material layer, allowing for the use of the electrochromic material regional backlight unit dimming control system to increase the contrast of images displayed by an LCD display of a mobile information handling system such as a laptop or tablet computer.

Embodiments of the present disclosure address this issue by employing fewer electrodes within the electrochromic material layer. As described above, assigning an electrode to each pixel of the LCD display may maximize the contrast unnecessarily while simultaneously increasing the bulk, weight, and cost of the system such that it is not viable for use in a mobile information handling system. Thus, using fewer electrodes, but still enough to achieve the contrast needed to meet the HDR standards may decrease the cost, weight, and bulk of the system sufficiently to make use of the system in an information handling system viable.

Further, the use of fewer electrodes results in the control of a single electrode of the electrochromic material impacting the light emitted by a plurality of pixels of the LCD display. Because the electrodes of the electrochromic material in such embodiments are not strictly assigned to an individual pixel, the electrochromic material need not be placed within the LCD panel, in close contact with the front transistor of the transistor layer. Thus, embodiments of the present disclosure may include placement of the electrochromic material layer between the transistor layer and the reflector layer proximate to the interior surface of the top of the chassis. In other words, in contrast to previous solutions, embodiments described herein may include placement of the electrochromic material on the backside of the transistor layer, rather than between the transistor layer and the LCD display screen, or top-most glass sheet (e.g. on the front side of the transistor layer). In some embodiments, the electrochromic material layer may be placed between the LCD panel and the reflector layer proximate to the interior surface of the top of the chassis, rather than within the LCD panel, thus decreasing the complexity and cost of the system. In such a way, the electrochromic material regional backlight unit dimming control system may provide the high contrast capabilities required by the HDR image standards using a cheaper, lighter, smaller system for use in mobile information handling systems having a small form-factor chassis.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU) 114, hardware or software control logic, or any combination thereof. Additional components of the information handling system can include one or more storage devices, one or more communications ports for communicating with external devices, as well as, various input and output (110) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. In some embodiments, the processor 102 may be a graphics processing unit (GPU). Any of the processing resources may operate to execute code that is either firmware or software code. Moreover, the information handling system 100 can include memory such as main memory 104, static memory 106, computer readable medium 122 storing instructions 124 of the learning dynamic gamma-correction optimization system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a host video display 110. The host video display 110 in an embodiment may function as a liquid crystal display (LCD), a flat panel display, or a solid state display. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may also include an electrochromic material regional backlight unit dimming control system 132 that may be operably connected to the bus 108. The electrochromic material regional backlight unit dimming control system 132 computer readable medium 122 may also contain space for data storage. The electrochromic material regional backlight unit dimming control system 132 may perform tasks related to dimming light emitted by pixels in a region of the video display 110 using an electrochromic material situated within the video display 110.

In an embodiment, the electrochromic material regional backlight unit dimming control system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute an electrochromic material regional backlight unit dimming control system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Win32s, Win64, WinCE, Core Java API, or Android APIs.

The disk drive unit 116 and the electrochromic material regional backlight unit dimming control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the electrochromic material regional backlight unit dimming control system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some, or all of the electrochromic material regional backlight unit dimming control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The electrochromic material regional backlight unit dimming control system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
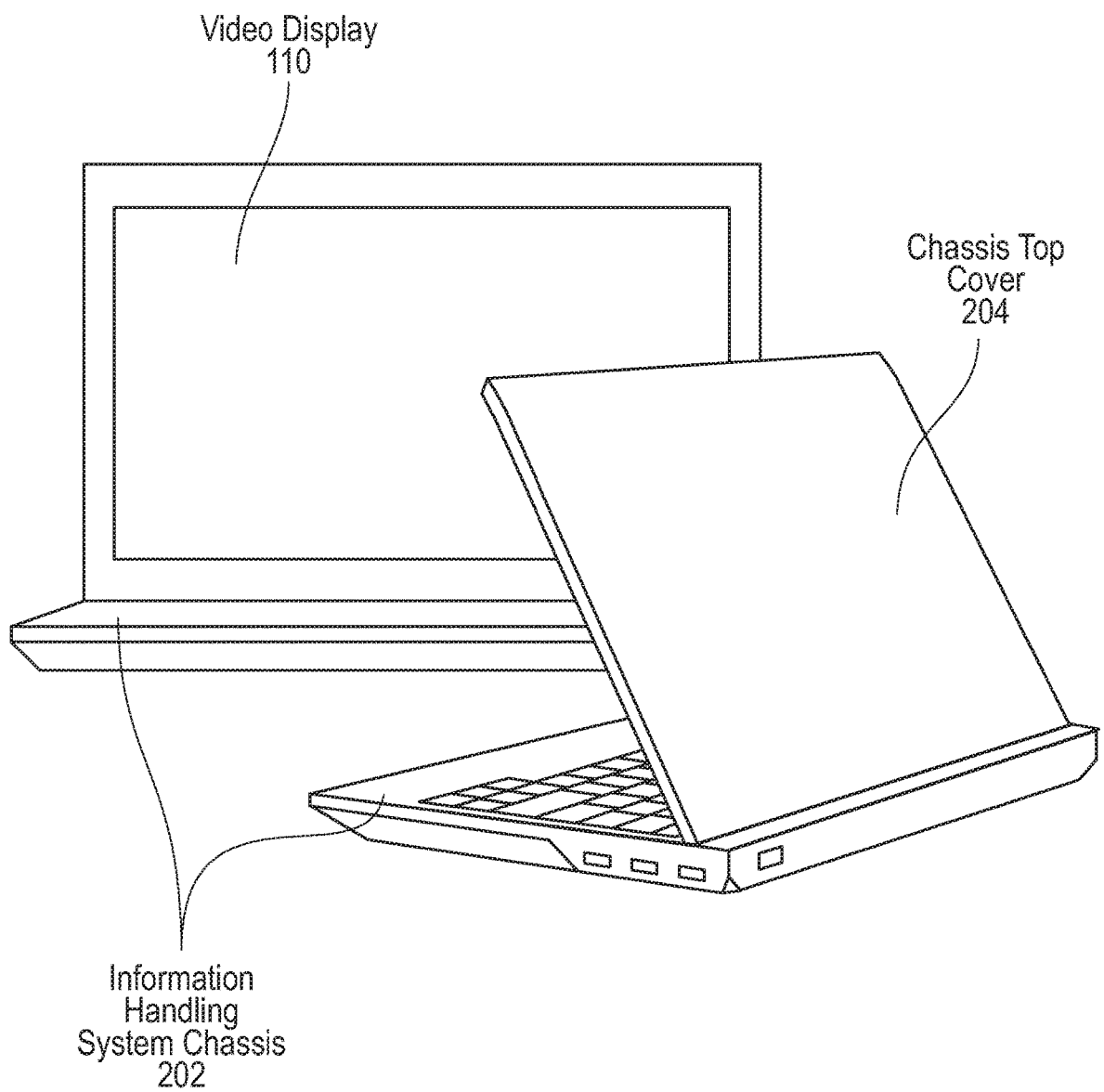
FIG. 2 is a graphical diagram of an information handling system chassis enclosing a video display according to an embodiment of the present disclosure.

FIG. 2 is a graphical diagram of an information handling system small form-factor chassis enclosing a video display according to an embodiment of the present disclosure. An information handling system in an example embodiment may include a mobile information handling system such as a laptop or tablet computer. Other embodiments may include a smart phone or wearable device. The information handling system of an embodiment may include a video display 110, such as, for example an LCD display device. The video display 110 and the information handling system in an embodiment may be enclosed within an information handling system chassis 202, such as a small form-factor case, for example.

The chassis 202 may be capable of functioning in a plurality of configurations, including a clamshell mode, as shown in FIG. 2, in which the video display 110 lies at an angle between zero and 180 degrees from the keyboard of the information handling system. In another example configuration, the chassis 202 may also be placed in a tablet mode in which the video display 110 lies at an angle between 270 and 360 degrees from the keyboard of the information handling system. The chassis 202 may include sub-parts, such as a base and a cover, where the base encloses the keyboard and the cover encloses the video display 110. The cover of the chassis 202 may also include a top portion 204 situated behind the video display 110 so as to enclose the electronic components associated with the video display 110.

Figure 3:
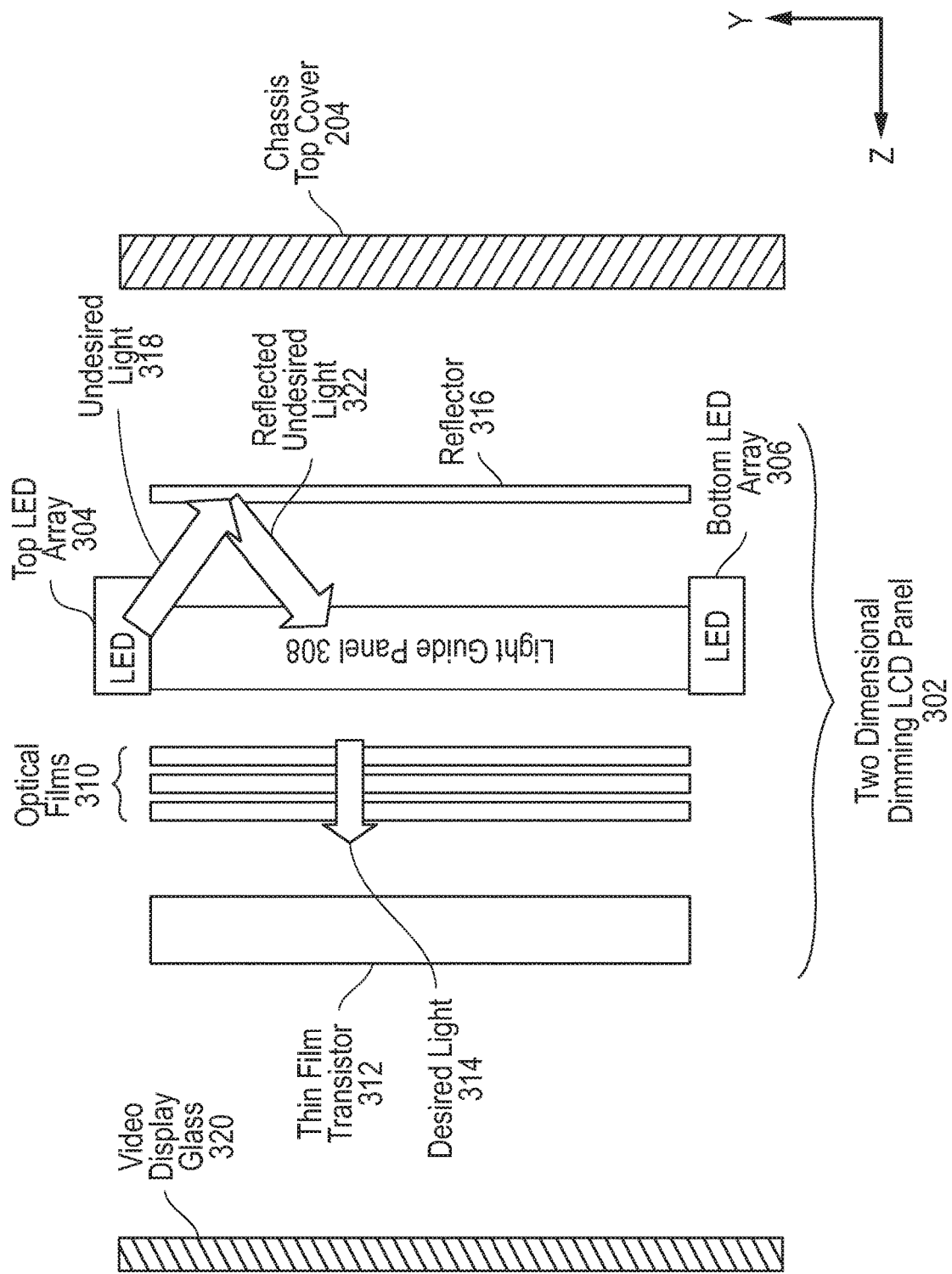
FIG. 3 is a block diagram illustrating an exploded cross-sectional view of a local dimming backlight unit according to previous solutions.

FIG. 3 is a block diagram illustrating an exploded cross-sectional view of a local dimming backlight unit using a plurality of LED arrays according to previous solutions. Embodiments of the present disclosure may share some aspects as the previous solutions. For example, the two dimensional dimming LCD panel 302 in an embodiment may be enclosed between the video display glass 320 and the chassis top cover 204. The exploded view of FIG. 3 illustrates a cross-sectional view in the YZ plane, where the X axis runs from the left to the right side of the video display when facing the video display, the Y axis runs from the bottom to the top of the video display when facing the video display, and the Z axis runs throughout the thickness of the chassis cover of the information handling system, from the chassis top cover 204 to the video display glass 320.

Many video displays, such as liquid crystal displays (LCDs) employ a backlight unit in order to project light through a plurality of pixels to produce an image. Such a backlight unit may include a plurality of light emitting diodes (LEDs) emitting light through a light guide plate and toward the LCD display screen. For example, the two dimensional dimming LCD panel 302 may include a top LED array 304 and a bottom LED array 306 emitting light through the light guide plate 308. Other embodiments may include only a bottom LED array 306 or only a top LED array 303. The light guide plate 308 may operate to guide desired light 314 emitted from the LED array 304 and/or 306 through the optical films 310 and toward the transistor layer 312. Optical films 310 may include, for example, horizontal and vertical polarizers, in an embodiment. In other aspects of an embodiment, the optical films 310 may further include retardation films and diffuser films. The transistor layer 312 in an embodiment may include a plurality of transistors operating to manipulate liquid crystals in a liquid crystal layer to allow varying levels of desired light 314 to be projected through an RGB masque layer. For example, the transistor layer 312 in an embodiment may be a thin-film transistor layer that controls the amount of the desired light 314 projected by each pixel of the video display.

While the intent of such a backlight unit may be to emit the desired light 314 toward the transistor layer 312, a portion of the light emitted by either the top LED array 304 and/or the bottom LED array 302 may stray toward the top exterior surface of the chassis. For example, the top LED array 304 may emit undesired light 318 toward the chassis top cover 204 rather than toward the transistor layer 312. In order to keep such undesired light 318 from being emitted through the top exterior surface of the chassis 204, the two dimensional dimming LCD panel 302 in embodiments described herein may further include a reflector sheet 316 placed between the LEDs 304 and 306 and the top exterior surface of the chassis 204 to reflect undesired light 318 back toward the transistor film 312 and away from the top exterior surface of the chassis 204. For example, the reflector sheet 316 may reflect undesired light 318, to emit reflected undesired light 322.

Desired light 314 and reflected undesired light 322 in an embodiment may reach the transistor layer 312, and may be allowed to pass through the liquid crystal layer between the transistor layer 312 and the color filter glass to the video display glass 320 to varying degrees. Each liquid crystal in the liquid crystal layer may control the intensity of the desired light 314 projected through a single sub-pixel of a video display based on the level of current delivered across it by the transistor layer 312. Each pixel may include three sub-pixels, one red, one green, and one blue. Every color the video display is capable of displaying may be characterized by a combination of red, green, and blue lights emitted at various and independent intensities. For example, white light may be produced at a given pixel by emitting each of the red, green, and blue sub-pixels at their maximum intensities. In other words, white light of a single pixel may be achieved by setting the liquid crystals associated with each of the sub-pixels of that pixel to allow all of the desired light 314 to pass through the liquid crystal layer and to the sub-pixels. In contrast, black may be achieved by failing to emit any light via the three sub-pixels of a given pixel. In other words, black light of a single pixel may be achieved by setting the liquid crystals associated with each of the sub-pixels of that pixel to block desired light 314 entirely. By controlling the intensity of light projected through each sub-pixel, the transistor layer 312 may consequently control the color of light emitted by each pixel individually.

When the transistor layer 312 passes no current through the liquid crystals associated with a given pixel (e.g. places the given pixel in an off position), the associated pixel is meant to achieve the minimum black level of the LCD display. The ability to achieve this minimum black level is key to achieving the contrast required to meet the HDR standards requiring a contrast of at least 20,000 to one between the peak luminance value and black level of the LCD display. However, the liquid crystals often allow for some bleed-through of light, even when no current is applied across them, due in part to the inadvertent reflection of the reflected undesired light 322.

One method of overcoming this problem, referred to herein as local dimming includes turning off one or more of the LEDs located nearby the pixels of the LCD display meant to display at the minimum black level. For example, by turning off one or more of the LEDs in the top LED array 304, the undesired light 318 and resulting reflected undesired light 322 may be decreased or removed in an embodiment. In such a way, the light bleed-through occurring at the liquid crystal layer may also be decreased or removed, causing the contrast between peak luminance and black level to also increase.

Figure 4:
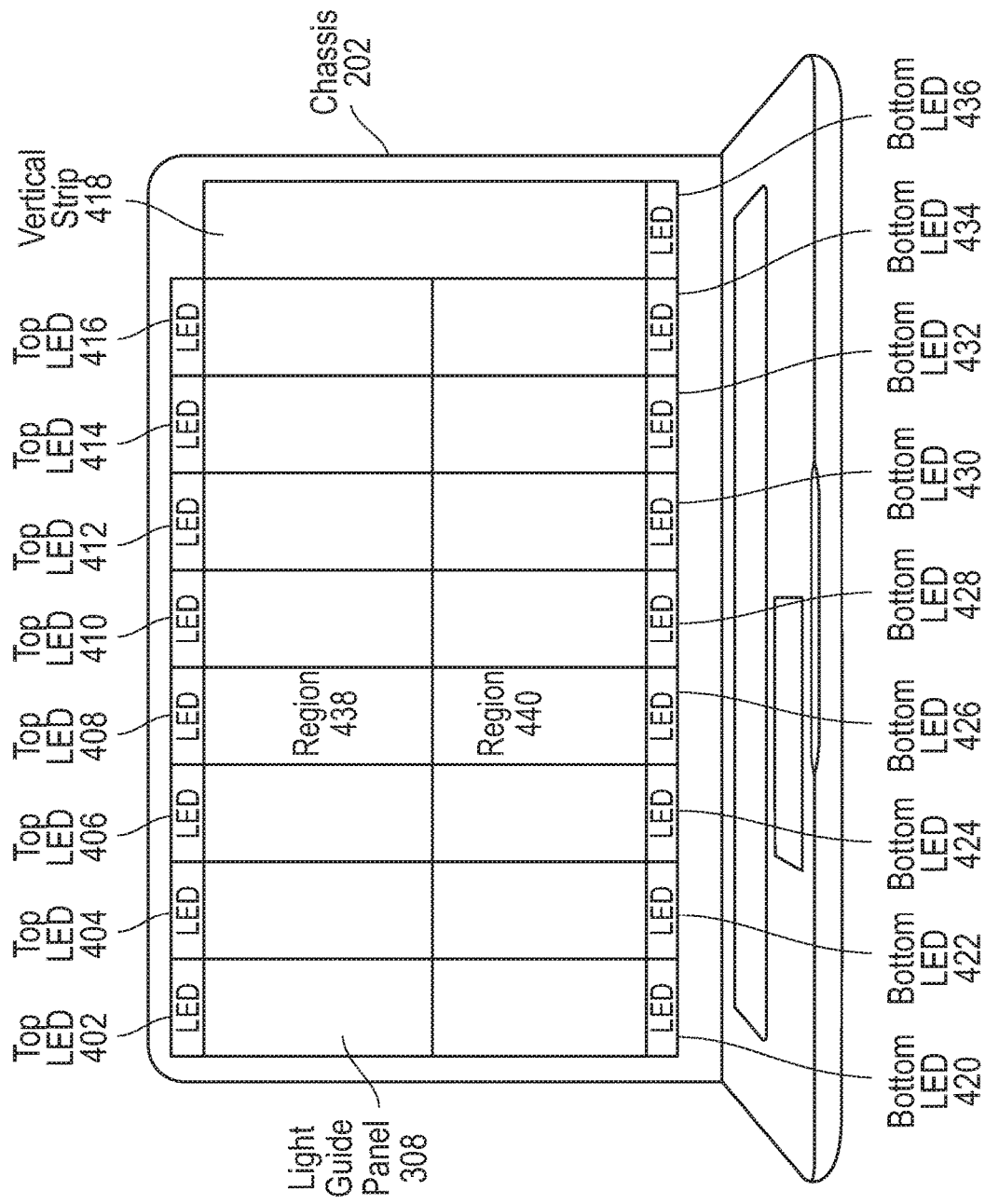
FIG. 4 is a graphical diagram illustrating presence or absence of light emitted pursuant to a local dimming method according to an embodiment of the present disclosure.

FIG. 4 is a graphical diagram illustrating presence or absence of light emitted through portions of a light guide plate pursuant to a local dimming method according to an embodiment of the present disclosure. As described herein, one way to decrease light bleed-through at the liquid crystal layer, thus increasing contrast between peak luminance and black level in a display is the use of a local dimming method. Such a local dimming method may involve turning off one or more of the LEDs of the LCD display off, if such an LED is situated nearby a pixel or group of pixels associated in an HDR image data with the color black.

The LCD display in an embodiment may be enclosed within chassis 202 and may include a light guide plate 308, and one or more LED arrays. For example, the LCD display in an embodiment may include a top LED array that further includes LEDs 402, 404, 406, 408, 410, 412, 414, and 416. The LCD display in another embodiment may include a bottom LED array that further includes LEDs 420, 422, 424, 426, 428, 430, 432, 434, and 436. In yet other embodiments, the LCD display may include both the top LED array (e.g. LEDs 402-416) and the bottom LED array (e.g. LEDs 420-436). Light emitted from each of the LEDs in an embodiment may pass through the light guide plate 308 and toward a liquid crystal layer that may then control the intensity of the light passing through each of a plurality of liquid crystals. In such a way, the intensity of light and consequently the color emitted by each pixel may be controlled. In order to display a minimum black level at a given pixel, the amount of light passing through the liquid crystals associated with that pixel may be minimized. Because liquid crystals often allow for light to leak through, decreasing the amount of light delivered to those liquid crystals may be needed in order to achieve the minimum black level. This may involve decreasing the amount of light emitted by the LEDs nearby such a pixel.

In an embodiment in which the LCD display includes only the bottom LED array 420-436, turning off bottom LED 436 in that array may decrease the amount of light passing through a vertical strip 418 of the light guide plate 308. However, such a method would impact the amount of light emitted by all of the liquid crystals receiving light via the vertical strip 418 of the light guide plate 308. If the HDR image displayed by the LCD display instructs some of the liquid crystals receiving light through this vertical strip 418 to allow higher intensity light through, such a method could effectively decrease the amount of light bled-through to pixels associated with the black level, but may also decrease the amount of light delivered to pixels meant to display at high intensity levels, thus distorting the image. A solution is needed that can adjust the brightness of more granular regions of the LCD display (e.g. regions smaller than vertical strip 418) in order to maximize the contrast of the displayed image while preserving the image. Regions such as 438 and 440 may be vertical strips, a grid, or may be arranged in any pattern with regions even having differing sizes from one another.

One solution to this issue may include addition of further LEDs along more edges of the light guide plate. For example, the LCD display in an embodiment may include the top LED array (e.g. LEDs 402-416) in addition to the bottom LED array (e.g. LEDs 420-436). In such an embodiment, one of the LEDs in the top LED array may be turned off, while the LED in the bottom array positioned directly beneath the deactivated top LED may be turned on. For example, the top LED 408 may be turned off while the bottom LED 426 is turned on. Such a method may cause the amount of light emitted by all of the liquid crystals receiving light via region 438 to decrease, while allowing the amount of light emitted by all of the liquid crystals receiving light via region 440 to remain higher. Because the regions 438 and 440 are smaller than vertical strip 418, each of region 438 and 440 deliver light to fewer liquid crystals than vertical strip 418. As the number of liquid crystals receiving light from a given region decreases, so to do the chances that some liquid crystals receiving light from that region are instructed to allow high intensity light to pass through while other liquid crystals receiving light from that same region are instructed to block light from passing through. In other words, the addition of a second array of LEDs 402-416 in such an embodiment provides more regional granularity, thus increasing the contrast between pixels while preserving the HDR image.

However, even more regional granularity may achieve greater contrast while still preserving the HDR image. Further, the addition of the second LED array 402-416 may increase the bulk, weight, and cost of the LCD display. Such an increase may make the use of two separate LED arrays non-viable for mobile information handling systems such as laptops and tablets. A solution is needed that provides higher regional granularity without the use of additional LEDs.

Figure 5:
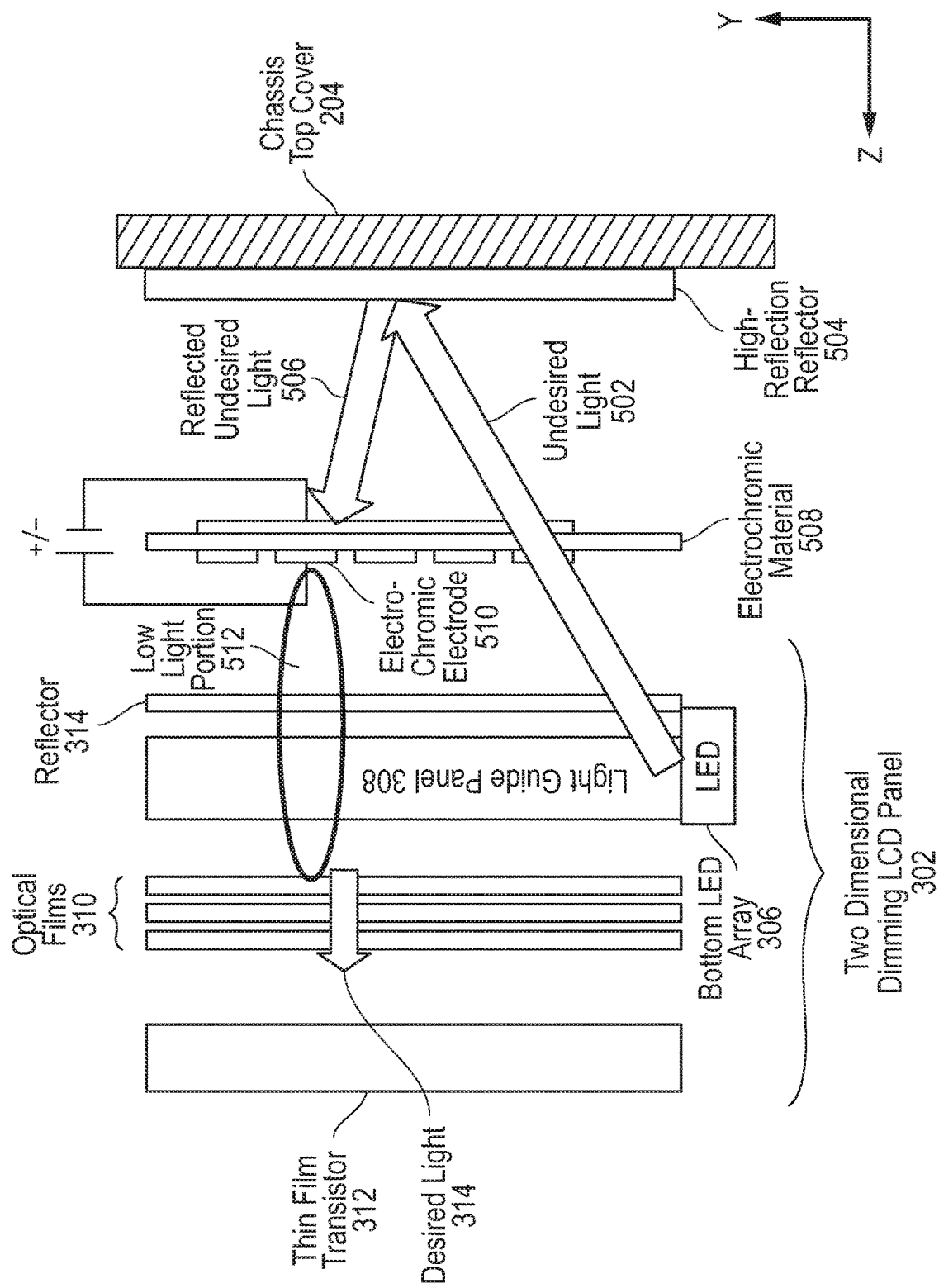
FIG. 5 is a block diagram illustrating an exploded cross-sectional view of a regional dimming backlight unit according to an embodiment of the present disclosure.

FIG. 5 is a block diagram illustrating an exploded cross-sectional view of a regional dimming backlight unit and an electrochromic material layer according to a first embodiment of the present disclosure. Use of an electrochromic material to block light emitted through a plurality of smaller regions of an LCD display in an embodiment may provide greater regional granularity for dimming without markedly increasing the weight, bulk, or cost of the information handling system. The electrochromic material layer in an embodiment may measure less than a millimeter in thickness (e.g. 0.4 mm), which results in less space occupied within the chassis, and less weight than addition of a second LED array. For example, the two dimensional dimming LCD panel 302 in an embodiment may include only the bottom LED 306, and remove the top LED. Still, undesired light 502 may be emitted from the bottom LED 306 in an embodiment and reflected against a high reflection reflector 504 proximate to the chassis top cover 204 to emit reflected undesired light 506 toward the transistor film 312. However, placement of the electrochromic material 508 between the transistor 312 and the high-reflection reflector 504 in an embodiment may allow the electrochromic material 508 to block reflected undesired light 506 from reaching the transistor layer 312.

Types of electrochromic material 508 that may be used in an embodiment may include metal oxides, such as tungsten oxide. In other embodiments, viologens may be used, or conducting polymers such as polpyrrole, poly 3,4-ethylenedioxythiophene (PEDOT), or polyaniline may be used. In yet another embodiment, viologens may be used in conjunction with titanium dioxide. The electrochromic material 508 in an embodiment may include a plurality of electrodes, including electrochromic electrode 510. An electrochromic material regional backlight unit dimming control system in embodiments may instruct the operation of each electrode separately, including electrode 510. For example, the electrochromic material regional backlight unit dimming control system in embodiments may leave electrode 510 deactivated by not applying a current to it. A deactivated electrode 510 may allow a portion of the electrochromic material 508 in contact with the electrode 510 to appear translucent (e.g. allowing reflected undesired light 506 to pass straight through). As another example, the electrochromic material regional backlight unit dimming control system may activate electrode 510 by applying a current to it. An activated electrode 510 in embodiments may allow a portion of the electrochromic material 508 in contact with the electrode 510 to appear opaque, thus disallowing reflected undesired light 506 to pass through that portion of the electrochromic material 508.

Light blocked by electrode 510 of the electrochromic material 508 may cause a low-light portion 512 of the light guide plate 308 to receive light of a lesser intensity. The low light portion 512 may be situated perpendicularly from the surface of the electrochromic electrode 510. In such a way, the electrochromic material regional backlight unit dimming control system in an embodiment may use the electrochromic material to decrease light delivered to a portion of the light guide plate 308 having roughly the same dimensions as the electrochromic electrode 510.

As described herein, changing the amount of light emitted through or from a portion 512 of the light guide plate 308 may impact the amount of light passing through each of the liquid crystals receiving light from such a low light portion 512. As the number of liquid crystals receiving light from a given low light portion 512 decreases, so to do the chances that some liquid crystals receiving light from that low light portion 512 are instructed to allow high intensity light to pass through while other liquid crystals receiving light from that same region are instructed to block light from passing through. Decreasing the amount of light delivered to liquid crystals instructed to emit a higher intensity light may distort the HDR image. Thus, decreasing the number of liquid crystals receiving light from the low light portion 512 may increase the contrast of the LCD display while preserving the HDR image. Because the size of the low light portion 512 may be dictated by the size of the electrochromic electrode 510, decreasing the size of the electrochromic electrode 510 may achieve this goal in an embodiment.

One solution employing an electrochromic material to provide regional dimming of an LCD display may include the use of a single electrode of the electrochromic material for each individual pixel or sub-pixel of the LCD display. Such a solution may maximize contrast between pixels, but the maximizing of contrast may not be necessary in order to achieve the contrast required by the HDR image standards. In other words, a balance needs to be struck between the benefits and drawbacks of such a solution. For example, such a solution may also greatly increase the weight, bulk, and cost of the electrochromic material layer. Thus, such solutions are better suited for stationary displays such as wall-mounted televisions where bulk and weight may not be critical factors, rather than for mobile devices such as laptop and tablet computers where bulk and weight are critical factors. Further, in order to properly align each electrode with an individual pixel, the electrochromic material may need to lie in close contact with the front electrodes of the transistor layer. Thus, such solutions may include placement of the electrochromic material within the LCD panel, between the transistor layer and the LCD display screen, or top-most glass sheet (e.g. on the front side of the transistor layer). Placement of the electrochromic material within the LCD panel may further increase the complexity and cost of the system. A solution is needed that decreases the weight, bulk, and cost of the electrochromic material layer, allowing for the use of the electrochromic material regional backlight unit dimming control system to increase the contrast of images displayed by an LCD display of a mobile information handling system such as a laptop or tablet computer.

Embodiments of the present disclosure address this issue by employing fewer electrodes within the electrochromic material layer than there are sub-pixels of the LCD display. In other words, the electrochromic electrode 510 in an embodiment may be larger than a single sub-pixel or a single pixel of the LCD panel 302. Thus, the low light portion 512 of the light guide plate 308 may provide light for a plurality of pixels of the LCD panel 302. Using fewer electrodes of the electrochromic material 508 in an embodiment, but still enough electrodes to achieve the contrast needed to meet the HDR standards, may decrease the cost, weight, and bulk of the system sufficiently to make use of the system in a mobile information handling system viable.

Further, because the electrode 512 of the electrochromic material 508 in an embodiment is not strictly assigned to an individual pixel of the LCD panel 302, the electrochromic material 508 need not be placed within the LCD panel 302, or in close contact with the front transistor of the transistor layer 312. Thus, the electrochromic material 508 in an embodiment may be located between the transistor layer 312 and the high-reflection reflector layer 504 proximate to the interior surface of the top of the chassis 204. In other words, in contrast to previous solutions, embodiments described herein may include placement of the electrochromic material on the backside of the transistor layer 312, rather than between the transistor layer 312 and the LCD display screen, or top-most glass sheet (e.g. on the front side of the transistor layer). In the embodiment described with reference to FIG.

5, the electrochromic material layer may be placed between the LCD panel 302 and the reflector layer 504 proximate to the interior surface of the top of the chassis 204, rather than within the LCD panel 302, thus further decreasing the complexity and cost of the system. Although in other embodiments, the electrochromic material 508 may be placed within the LCD panel. In such a way, the electrochromic material regional backlight unit dimming control system may provide the high contrast capabilities required by the HDR image standards using a cheaper, lighter, smaller system for use in mobile information handling systems having a small form-factor chassis.

Figure 6:
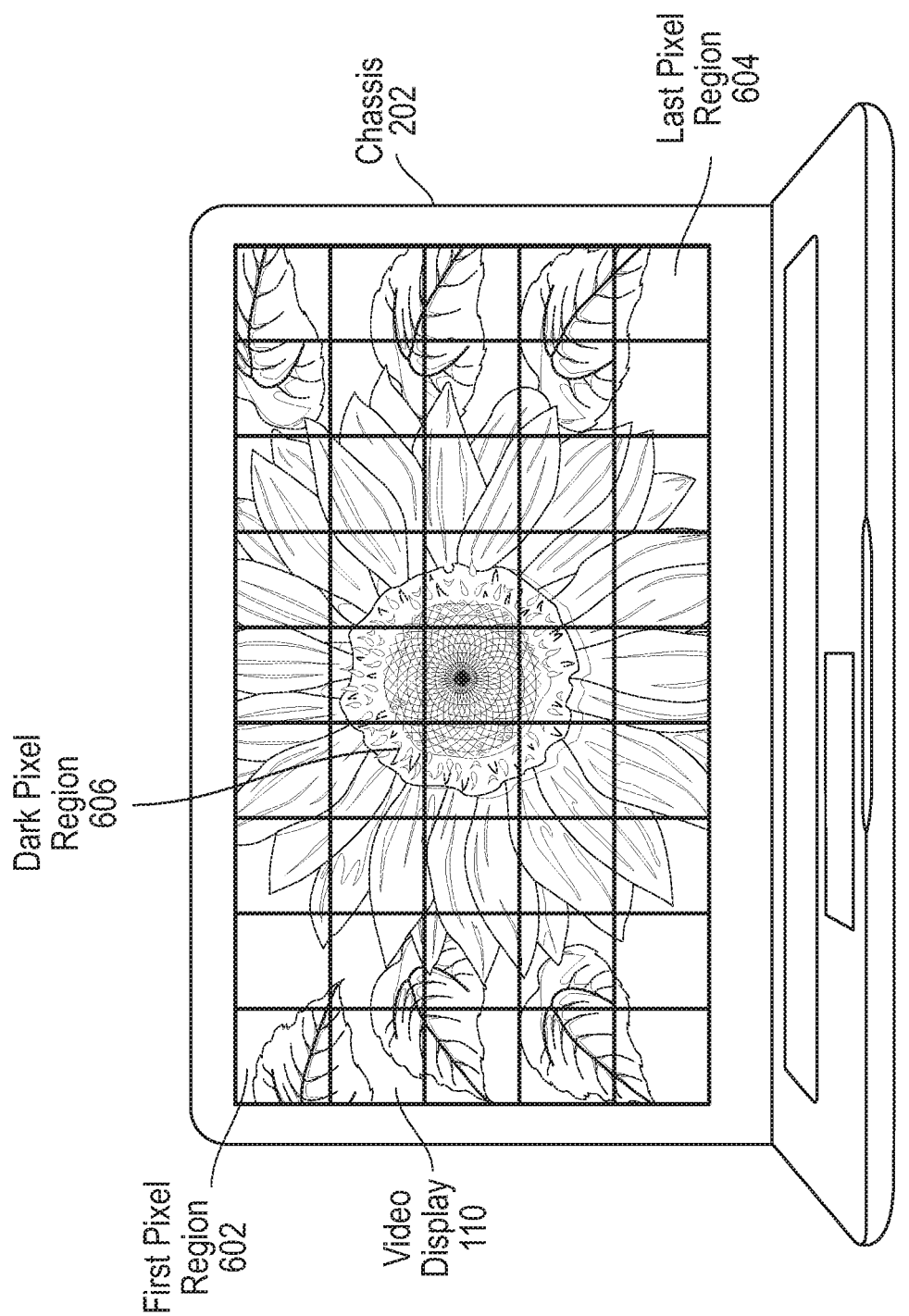
FIG. 6 is a graphical diagram illustrating presence or absence of light emitted pursuant to a regional dimming method according to an embodiment of the present disclosure.

FIG. 6 is a graphical diagram illustrating presence or absence of light emitted by a video display pursuant to a regional dimming method according to an embodiment of the present disclosure. As described herein, one way to decrease light bleed-through at the liquid crystal layer, thus increasing contrast between peak luminance and black level in a display is the use of a local dimming method. Such a local dimming method may lack granularity in the number of pixels affected by attempts to decrease light bleed-through, however. A regional dimming method improves upon this concept by decreasing the size of the areas affected by each individual attempt at decreasing bleed-through of light at the liquid crystal layer, allowing for closer tailoring of contrast values.

In an embodiment, a regional dimming method may bifurcate the pixels of the video display into a plurality of pixel regions. For example, the electrochromic material regional backlight unit dimming control system in an embodiment may use a regional dimming method to bifurcate the pixels of the video display 110 into a plurality of pixel regions, starting with a first pixel region 602 in the upper left hand corner of the video display 110 and ending with a last pixel region 604 in the lower right hand corner of the video display 110, for a total of 45 pixel regions. Each pixel region may be associated with a single electrode within the electrochromic layer. Further, each pixel region may include a plurality of pixels of the video display 110. The light emitted by each of the plurality of pixels within a given pixel region may be controlled by either allowing or disallowing light to propagate through the electrochromic electrode associated with that pixel region, as described above with reference to FIG. 5.

The electrochromic material regional backlight unit dimming control system in an embodiment may receive HDR image data associating each pixel of the video display 110 with a light intensity value at which the pixel should emit light in order to display an HDR image. The electrochromic material regional backlight unit dimming control system in an embodiment may perform a histogram analysis for each of the pixels within a given pixel region in order to determine an average intensity associated within the HDR image data with each of the pixels within a given pixel region. If the average of the intensity values associated with each of the pixels within a pixel region meets a minimum threshold value, the electrochromic material regional backlight unit dimming control system may determine the light delivered to all of the pixels within that pixel region should be limited using the electrochromic electrode associated with that pixel region. Such a threshold value in an embodiment may be preset during manufacture of the information handling system, or may be adjusted dynamically via firmware for the video display 110. An example threshold value needed to identify a pixel region as requiring use of the electrochromic electrode to limit light delivered thereto may be five nits in an embodiment. In another embodiment, this threshold value may be ten nits, for example.

The average of the intensities associated with each of the pixels within a given pixel region may only meet the threshold value when the majority of the pixels within the given pixel region are associated with a relatively dark color. For example, the electrochromic material regional backlight unit dimming control system in an embodiment may determine from a histogram analysis of the first pixel region 602 that the first pixel region 602 includes far more pixels associated with higher intensity light values (e.g. those needed to generate the sky color) than pixels associated with lower intensity light values (e.g. those needed to generate the leaf color). In another example, the electrochromic material regional backlight unit dimming control system in an embodiment may determine from a histogram analysis of the last pixel region 604 that the last pixel region 604 includes roughly the same number of pixels associated with higher intensity light values (e.g. those needed to generate the sky color) as the number of pixels associated with lower intensity light values (e.g. those needed to generate the leaf color). In yet another example, the electrochromic material regional backlight unit dimming control system in an embodiment may determine from a histogram analysis of the darker pixel region 606 that the darker pixel region 606 includes primarily pixels associated with lower intensity light values (e.g. those needed to generate the dark brown flower pollen color).

In an embodiment in which the electrochromic material regional backlight unit dimming control system determines the average of the intensity values associated with each of the pixels within the darker pixel region 606 meets the threshold value (e.g. five nits), the electrochromic material electrode associated with that darker pixel region 606 may be activated. As described herein, the electrochromic material regional backlight unit dimming control system in an embodiment may activate a single electrochromic electrode by passing a current across it such that the electrochromic material in contact with it becomes opaque and blocks any undesired light generated by the backlight unit LED or reflected by the reflector layer proximate to the interior of the top of the cover chassis. By activating the electrochromic electrode associated with the darker pixel region 606, the electrochromic material regional backlight unit dimming control system in such an embodiment may thus decrease the amount of light delivered to the liquid crystals associated with each of the pixels within the darker pixel region 606. Consequently, less light may bleed through these liquid crystals, and the pixels in the darker pixel region 606 may emit less light, decreasing the overall black level of the video display 110 and increasing the overall contrast between the peak luminance value and black level of the video display 110.

Figure 7:
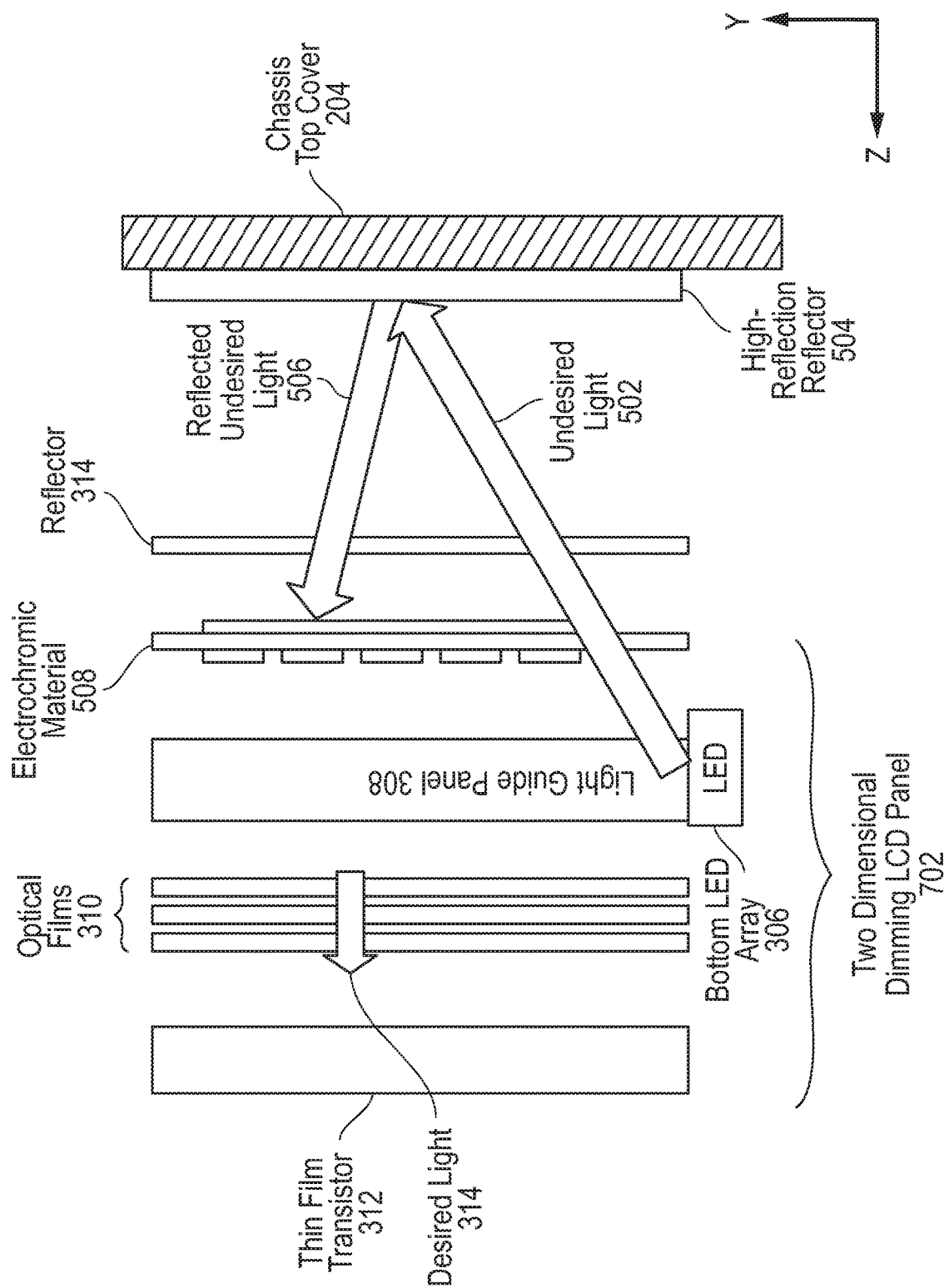
FIG. 7 is a block diagram illustrating an exploded cross-sectional view of a regional dimming backlight unit according to another embodiment of the present disclosure.

FIG. 7 is a block diagram illustrating an exploded cross-sectional view of a regional dimming backlight unit including an electrochromic material layer according to a second embodiment of the present disclosure. A second embodiment may involve placement of the electrochromic material within the LCD panel to create a modified LCD panel. For example, the electrochromic material 508 may be placed between the light guide plate 308 and a low-reflection reflector 314 of a modified two dimensional dimming LCD panel 702. Such an embodiment thus differs from an embodiment described with reference to FIG. 5 wherein the electrochromic material 508 was placed outside the LCD panel 302. However, the electrochromic material 508 in an embodiment described with reference to FIG. 7 may still operate to block a portion of reflected undesired light 506 coming into contact with an electrode of the electrochromic material 508.

Figure 8:
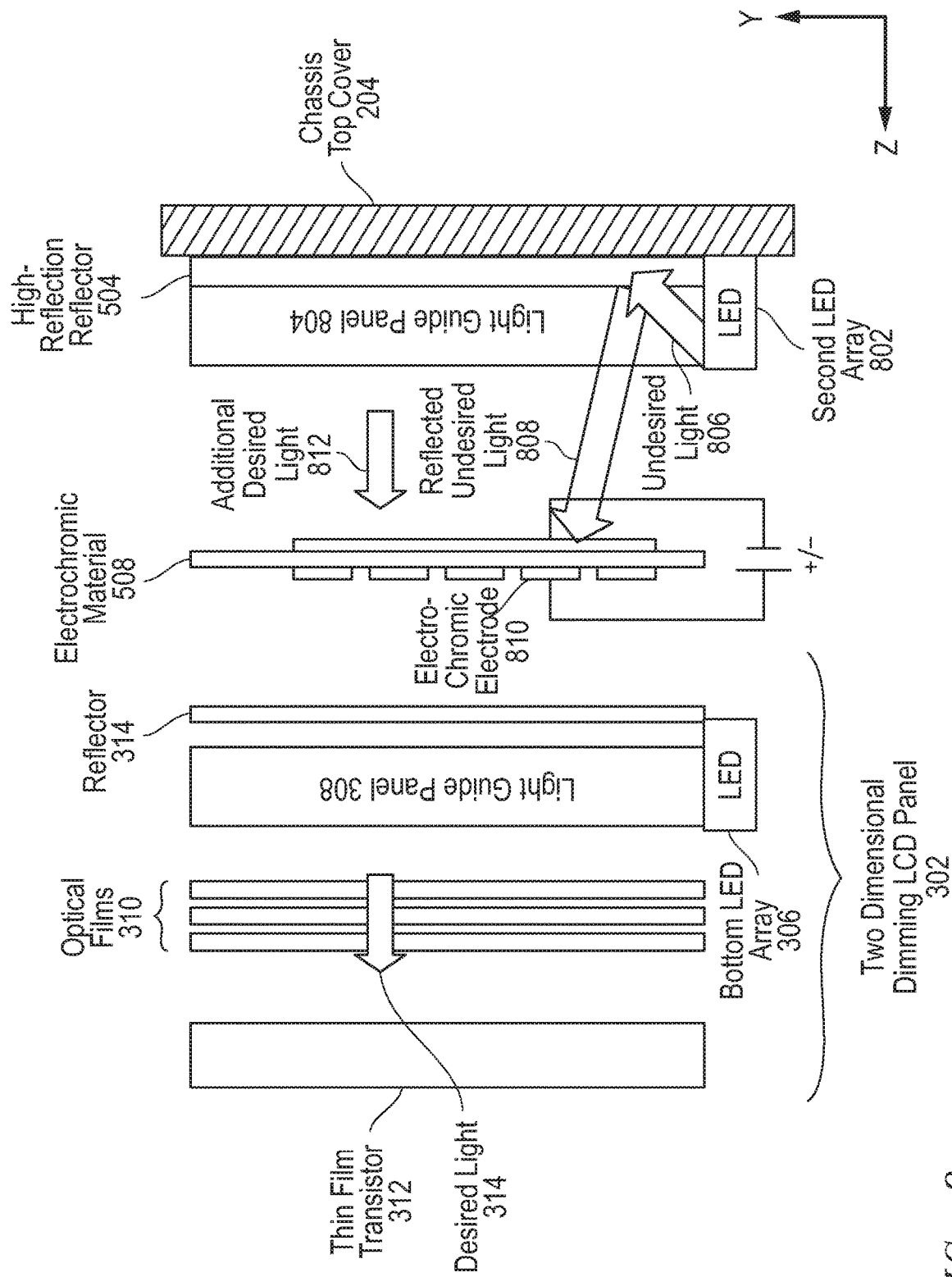
FIG. 8 is a block diagram illustrating an exploded cross-sectional view of a regional dimming backlight unit according to yet another embodiment of the present disclosure.

FIG. 8 is a block diagram illustrating an exploded cross-sectional view of a regional dimming backlight unit, an electrochromic material layer, and two light guide plates according to a third embodiment of the present disclosure. In some embodiments, a second light guide plate and second LED may be added to the information handling system. For example, a second bottom LED 802 may be added to the information handling system to abut the high-reflection reflector 504. In such an embodiment, light emitted from the second bottom LED 802 may pass through the light guide plate 804 to emit additional desired light 812. Increasing the amount of light delivered by the backlight systems of an information handling system in an embodiment may allow one or more pixels of the video display to emit light at a higher intensity or luminance than systems employing a single LED. This may increase the peak luminance value of the video display, thus further increasing the contrast between the peak luminance value and the black level of the video display. For example, adding a second bottom LED 802 may increase the peak luminance value of a video display to 600 nits in an embodiment. In another embodiment, adding the second bottom LED 802 may increase the peak luminance to 1,000 nits.

However, addition of the second bottom LED 802 may also generate additional undesired light 806, which may reflect off the high-reflection reflector 504 to cause reflected undesired light 808. In an embodiment in which the electrochromic material 508 is placed outside the LCD panel 302, between the LCD panel 302 and the reflector layer 504, the electrochromic material regional backlight unit dimming control system may block the reflected undesired light 808 from passing through a portion of the electrochromic material 508 by activating the electrochromic electrode 810 in contact with that portion of the electrochromic material 508. The electrochromic material regional backlight unit dimming control system may perform the same method to block reflected undesired light 808 in an embodiment in which the electrochromic material 508 is incorporated within the LCD panel to form a modified two dimensional dimming LCD panel, such as that described with reference to FIG. 7. In such a way, the electrochromic material regional backlight unit dimming control system may decrease the black level of the video display while the second bottom LED 802 simultaneously increases the peak luminance value of the video display. Thus, the additional LED may work in tandem with the electrochromic material regional backlight unit dimming control system to further increase the contrast between the peak luminance value and the black level of the video display.

Figure 9:
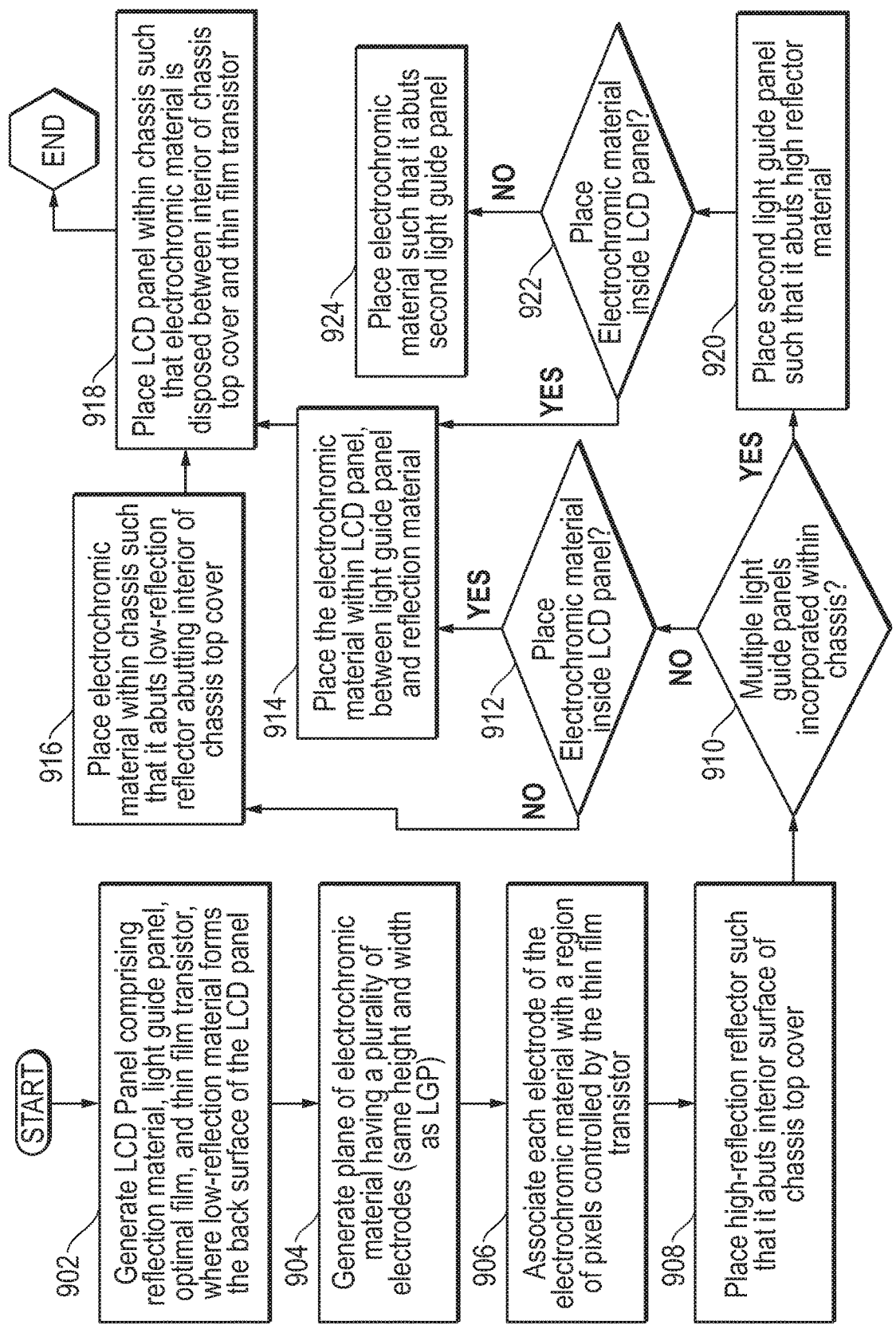
FIG. 9 is a flow diagram illustrating a method of disposing an electrochromic material layer on the backside of a transistor layer for an LCD display according to an embodiment of the present disclosure.

FIG. 9 is a flow diagram illustrating a method of generating a regional dimming system by disposing an electrochromic material layer on the backside of a transistor layer for an LCD display according to an embodiment of the present disclosure. As described herein, regional dimming solutions placing an electrochromic material layer on the front-side of a transistor layer for an LCD display and associating each electrode of the electrochromic material layer with a single pixel of the LCD display may unnecessarily increase the complexity, cost, weight, and size of the LCD display in order to maximize the contrast of the display. Embodiments of the present disclosure more effectively increase the contrast between the peak luminance value and black level of the LCD display by placing an electrochromic material with fewer electrodes than there are pixels on the backside of the transistor layer. Such a solution may be viable for use in mobile information handling systems such as laptops and tablets in an embodiment.

At block 902, an LCD panel comprising a reflection layer, a light guide plate, one or more optical films, and a transistor layer may be generated. For example, in an embodiment described with reference to FIG. 5, a two-dimensional dimming LCD panel 302 may include a bottom LED 306, a light guide plate 308, one or more optical films 310, and a transistor layer 312. Further, the reflection layer in an embodiment may form the back surface of the LCD panel. For example, the reflector 314 in an embodiment may form the back surface of the two dimensional dimming LCD panel 302. The light guide plate 308 in an embodiment may operate to guide desired light 314 emitted from the LED array 304 and/or 306 through the optical films 310 and toward the transistor layer 312. Optical films 310 may include, for example, horizontal and vertical polarizers, in an embodiment. The transistor layer 312 in an embodiment may include a plurality of transistors operating to manipulate liquid crystals in a liquid crystal layer to allow varying levels of desired light 314 to be projected through an RGB masque layer. For example, the transistor layer 312 in an embodiment may be a thin-film transistor layer that controls the amount of the desired light 314 projected by each pixel of the video display.

A plane of electrochromic material having a plurality of electrodes may be generated at block 904 in an embodiment. For example, in an embodiment described with reference to FIG. 5, electrochromic material 508 may be generated. The electrochromic material 508 in an embodiment may include a plurality of electrodes, including electrochromic electrode 510. An electrochromic material regional backlight unit dimming control system in embodiments may instruct the operation of each electrode separately, to either allow or disallow light to pass through a portion of the electrochromic material 508 in contact with the electrode. Blocking light from passing through a portion of electrochromic material 508 may cause a low-light portion 512 of the light guide plate 308 to receive light of a lesser intensity. The low light portion 512 may be situated perpendicularly from the surface of the electrochromic electrode 510. In such a way, the electrochromic material regional backlight unit dimming control system in an embodiment may use the electrochromic material to decrease light delivered to a portion of the light guide plate 308 having roughly the same dimensions as the electrochromic electrode 510.

At block 906 each electrode of the electrochromic material may be associated with a region of pixels controlled by the transistor layer. For example, in an embodiment described with reference to FIG. 6, the electrochromic material regional backlight unit dimming control system in an embodiment may use a regional dimming method to bifurcate the pixels of the video display 110 into a plurality of pixel regions, including a first pixel region 602, a dark pixel region 606, and a last pixel region 604. Each pixel region may include a plurality of pixels of the video display 110, and may be associated with a single electrode within the electrochromic layer.

As described herein, activating an electrode of the electrochromic layer in an embodiment may block light delivered to the light guide plate, causing a low-light portion of the light-guide panel. For example, in an embodiment described with reference to FIG. 5, activating electrode 510 may cause a low-light portion 512 of the light-guide panel 308. A liquid crystal of the liquid crystal layer receiving its light from this low-light portion 512 of the light-guide panel 308 may thus propagate less light to the pixel or sub-pixel associated with it. Each of the pixels within a given pixel region (e.g. dark pixel region 606 of FIG. 6) may receive light in such a way from the low-light portion 512 of the light guide plate 308. At block 906, the electrochromic material regional backlight unit dimming control system in an embodiment may identify the pixels within the video display that are affected by activation of each electrochromic electrode, group those pixels into a single pixel region, and associate the identities of each of those pixels with an identity of that electrochromic electrode within a data record stored in a memory of the information handling system.

A high-reflection reflector may be placed such that it abuts the interior surface of the chassis top cover in an embodiment at block 908. For example, in an embodiment described with reference to FIG. 5, the high-reflection reflector 504 may be placed such that it abuts the interior surface of the chassis top cover 204. The high-reflection reflector 504 in an embodiment may operate to reflect undesired light 502 emitted from the LED 306 toward the chassis top cover 204 away from the chassis top cover 204 such that light is not visible through the chassis cover. However, this may inadvertently cause reflected undesired light 506 to be reflected back toward the electrochromic material and the light guide plate 308.

At block 910, it may be determined whether multiple light guide plates will be incorporated within the chassis. In some embodiments, a second light guide plate and second LED may be added to the information handling system. For example, in an embodiment described with reference to FIG. 8, a second bottom LED 802 may be added to the information handling system to abut the high-reflection reflector 504. In such an embodiment, light emitted from the second bottom LED 802 may pass through the light guide plate 804 to emit additional desired light 812. Increasing the amount of light delivered by the backlight systems of an information handling system in an embodiment may allow one or more pixels of the video display to emit light at a higher intensity or luminance than systems employing a single LED. This may increase the peak luminance value of the video display, thus further increasing the contrast between the peak luminance value and the black level of the video display. For example, adding a second bottom LED 802 may increase the peak luminance value of a video display to 600 nits in an embodiment. In another embodiment, adding the second bottom LED 802 may increase the peak luminance to 1,000 nits. However, adding a second LED and/or backlight unit may also increase the amount of reflected unwanted light in an embodiment. At block 910, it may be determined whether to use one or two LEDs, and thus one or two light guide plates in an embodiment. If only one LED is incorporated within the video display, the method may proceed to block 912. If two LEDs will be incorporated within the video display, the method may proceed to block 920.

In an embodiment in which only one LED is incorporated within the video display, it may be determined at block 912 whether to place electrochromic material inside the LCD panel. As described herein, previous systems may have increased the contrast of video displays by using one electrode of the electrochromic material to control the light emitted by every single pixel of the video display. Such a solution may greatly increase the weight, bulk, and cost of the electrochromic material layer, and require the electrochromic material to lie in close contact with the front electrodes of the transistor layer. Thus, such solutions may include placement of the electrochromic material within the LCD panel, between the transistor layer and the LCD display screen, or top-most glass sheet (e.g. on the front side of the transistor layer). Placement of the electrochromic material within the LCD panel may further increase the complexity and cost of the system.

Embodiments of the present disclosure may use fewer electrodes of the electrochromic layer, allowing for the placement of the electrochromic layer behind the transistor layer, and even potentially outside the LCD panel. For example, in an embodiment described with reference to FIG. 5, the electrochromic material 508 need not be placed within the LCD panel 302, or in close contact with the front transistor of the transistor layer 312. Thus, the electrochromic material 508 in such an embodiment may be located between the transistor layer 312 and the high-reflection reflector layer 504 proximate to the interior surface of the top of the chassis 204.

However, the electrochromic layer may also be placed behind the transistor layer, but still within the LCD panel. For example, in an embodiment described with reference to FIG. 7, the electrochromic layer 508 may be placed within the modified two dimensional dimming LCD panel 702. The variety in possible placement of the electrochromic material layer in such embodiments may allow for more options when choosing a vendor for manufacture of such an LCD panel. If it is determined the electrochromic material may be placed inside the LCD panel, the method may proceed to block 914. If it is determined the electrochromic material may be placed outside the LCD panel, the method may proceed to block 916.

At block 914, the electrochromic material in an embodiment may be placed within the LCD panel, between the light guide plate and the reflection material. For example, if it is determined that the electrochromic material should be placed within the LCD panel, the electrochromic material in an embodiment described with reference to FIG. 7 may be placed within the modified two-dimensional dimming LCD panel 702. The electrochromic material in such an embodiment may be placed between the light guide plate 308 of the modified LCD panel 702 and the reflector 314 forming the back surface of the modified LCD panel 702.

The electrochromic material in an embodiment may be placed within the chassis such that it abuts the low-reflection reflector proximate to the interior of the chassis top cover at block 916. For example, it may be determined at block 910 that only one light guide plate will be used and decided at block 812 that the electrochromic material should be placed outside the LCD panel. In such an embodiment described with reference to FIG. 5, the electrochromic material layer may consequently be placed between the LCD panel 302 and the reflector layer 504 proximate to the interior surface of the top of the chassis 204, rather than within the LCD panel 302.

At block 918, the LCD panel in an embodiment may be placed within the chassis such that the electrochromic material is disposed between the interior of the chassis top cover and the thin film transistor. For example, in an embodiment described with reference to FIG. 5, the two-dimensional dimming LCD panel 302 may be placed within the chassis such that the electrochemical material 508 is disposed between the interior surface of the chassis top cover 204 and the transistor layer 312. In another example embodiment described with reference to FIG. 7, the modified two-dimensional dimming LCD panel 702 may be placed within the chassis such that the electrochemical material 508 is disposed between the interior surface of the chassis top cover 204 and the transistor layer 312.

At block 920, if it is determined that multiple light guide plates may be incorporated within the chassis, a second light guide plate and LED may be placed such that they abut the high reflector material. For example, in an embodiment described with reference to FIG. 8, a second LED 802 and a second light guide plate 804 may be incorporated within the chassis in order to guide additional desired light 812 emitted by the second LED 802 toward the transistor layer 302. In such a way, the peak luminance value of the video display may be increased. The light guide plate 804 and second LED 802 in such an embodiment may be placed such that they abut the high-reflection reflector 504 which may also abut the chassis top cover 204.

It may be determined at block 922 whether the electrochromic material may be placed inside the LCD panel in an embodiment. Similarly to video displays having only a single backlight unit, a video display including two or more backlight units may place the electrochromic material either inside or outside the LCD panel, allowing for more options when choosing a vendor for manufacture of such an LCD panel. If it is determined the electrochromic material may be placed inside the LCD panel, the method may proceed back to block 914 for placement of the electrochromic material within the LCD panel, just as this step was performed for a video display including only a single backlight system. If it is determined the electrochromic material may be placed outside the LCD panel, the method may proceed to block 924.

At block 924, the electrochromic material in an embodiment may be placed such that it abuts the second light guide plate. For example, in an embodiment described with reference to FIG. 8, the electrochromic material 508 may be placed such that it abuts the second light guide plate 804 on the side of the second light guide plate 804 opposite the high reflection reflector 504. In such a way, the electrochromic material 508 may block some or all reflected undesired light 808 reflected from the high-reflection reflector 504 in an embodiment.

Returning to FIG. 9, the method may then proceed to block 918 for placement of the LCD panel within the chassis. In an embodiment described with reference to FIG. 8, for example, the two dimensional dimming LCD panel 302 may be placed within the chassis such that the electrochromic material 508 is disposed between the interior of the chassis top cover 204 and the transistor layer 312. In another embodiment, the modified two dimensional dimming LCD panel 702 described with reference to FIG. 7 may be inserted within the chassis described with reference to FIG. 8 such that the electrochromic material 508 located within the modified two dimensional dimming LCD panel 702 is disposed between the interior of the chassis top cover 204 and the transistor layer 312. In other words, the second bottom LED 802 and second light guide plate 804 depicted in FIG. 8 may be added to either the embodiment described with reference to FIG. 5 (shown in FIG. 8), or may be added to the embodiment described with reference to FIG. 7. The method may then end.

Figure 10:
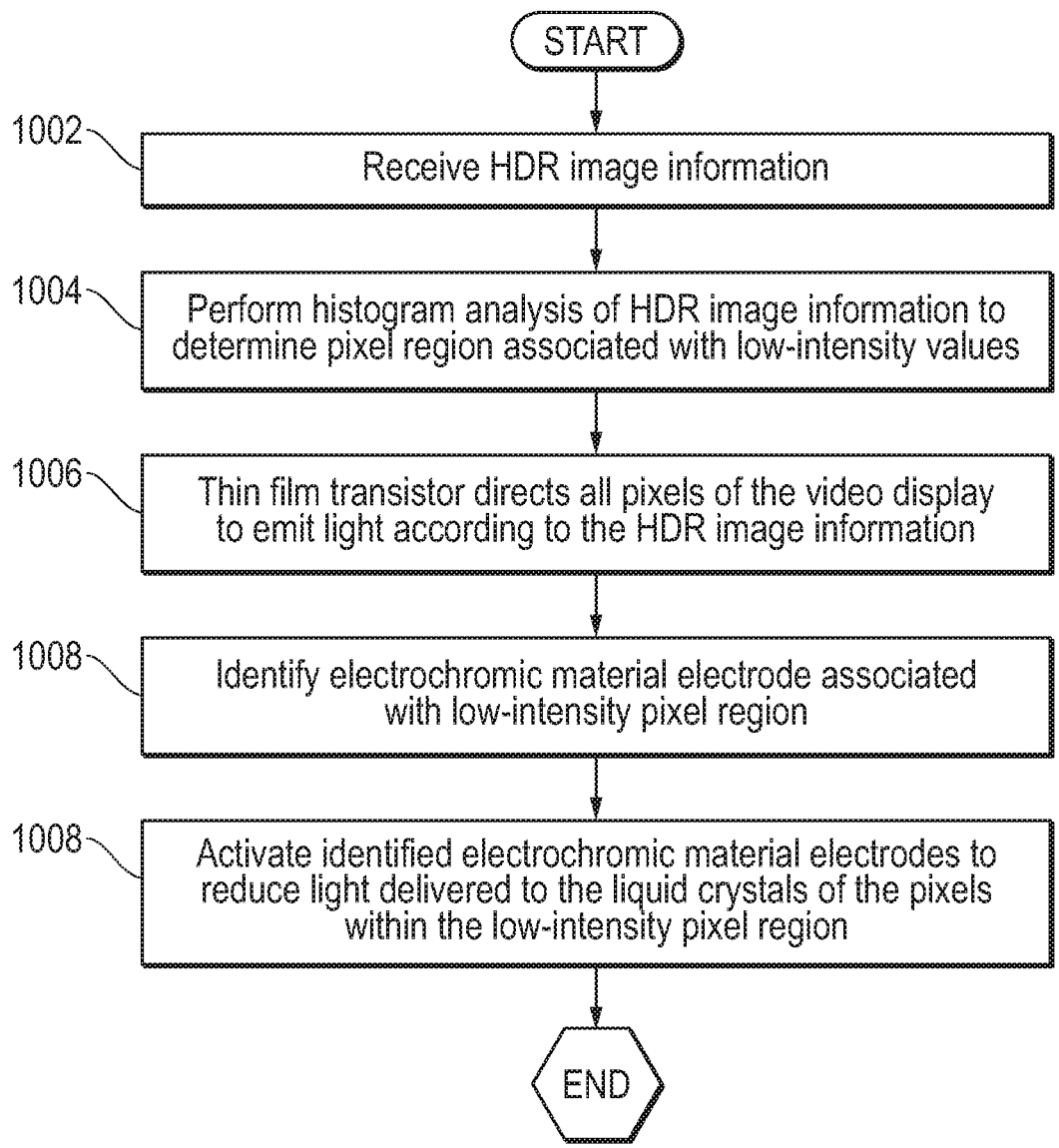
FIG. 10 is a flow diagram illustrating a method of blocking light from passing through a portion of an electrochromic material according to an embodiment of the present disclosure.

FIG. 10 is a flow diagram illustrating a method of blocking reflected, undesired light from passing through a portion of an electrochromic material associated with a pixel region of a video display according to an embodiment of the present disclosure. As described herein, blocking such light from reaching the liquid crystals associated with pixels assigned a dark intensity value by the HDR image data may increase the contrast between the peak intensity and black level of an LCD display cheaply, efficiently, and with little added weight and bulk.

At block 1002, the information handling system in an embodiment may receive HDR image information. Such HDR information may associate each pixel or sub-pixel of the LCD display with an intensity value at which to emit light. The highest intensity value associated with a pixel in the HDR data may be a peak luminance value of the LCD display, while the lowest intensity value may be a black level. While the liquid crystal for a pixel associated with a black level is not meant to allow any light to be emitted by that pixel, some light leaks through the liquid crystal in many circumstances. Thus, embodiments of the present disclosure limit the amount of light delivered to, and thus potentially leaked through by the liquid crystal.

A histogram analysis of the HDR image information may be performed in an embodiment at block 1004 to determine a pixel region associated with low-intensity values. For example, the electrochromic material regional backlight unit dimming control system in an embodiment may perform a histogram analysis for each of the pixels within a given pixel region of the video display in order to determine an average intensity associated within the HDR image data with each of the pixels within a given pixel region. If the average of the intensity values associated with each of the pixels within a pixel region meets a minimum threshold value, the electrochromic material regional backlight unit dimming control system may determine the light delivered to all of the pixels within that pixel region should be limited using the electrochromic electrode associated with that pixel region. For example, the electrochromic material regional backlight unit dimming control system in an embodiment described with reference to FIG. 6 may determine from a histogram analysis of the darker pixel region 606 that the darker pixel region 606 includes primarily pixels associated with lower intensity light values (e.g. those needed to generate the dark brown flower pollen color).

At block 1006 the transistor layer in an embodiment may direct all pixels of the video display to emit light according to the HDR image information. Each liquid crystal in the liquid crystal layer may control the intensity of the light projected through a single sub-pixel of a video display based on the level of current delivered across it by the transistor layer. Each pixel may include three sub-pixels, one red, one green, and one blue. Every color the video display is capable of displaying may be characterized by a combination of red, green, and blue lights emitted at various and independent intensities. By controlling the intensity of light projected through each liquid crystal, and thus through each sub-pixel, the transistor layer may consequently control the color of light emitted by each pixel individually, according to the HDR image information associating each sub-pixel with a given intensity value.

An electrochromic material electrode associated with a low-intensity pixel region may be identified in an embodiment at block 1008. When the transistor layer passes no current through the liquid crystals associated with a given pixel (e.g. places the given pixel in an off position), the associated pixel is meant to achieve the minimum black level of the LCD display. The ability to achieve this minimum black level is key to achieving the contrast required to meet the HDR standards requiring a contrast of at least 20,000 to one between the peak luminance value and black level of the LCD display. However, the liquid crystals often allow for some bleed-through of light, even when no current is applied across them, due in part to the inadvertent reflection of the reflected undesired light.

As described herein, one way to decrease this bleed-through effect is to decrease the intensity of light delivered to liquid crystals supplying light to pixels associated with lower intensity values in the HDR image data. Decreasing this bleed-through effect on a pixel-by-pixel basis may unnecessarily increase cost, complexity, weight, and bulk of the information handling system, as described herein. Thus, the electrochromic material regional backlight unit dimming control system in an embodiment may decrease this bleed-through effect on a region-by-region basis by decreasing the intensity of light delivered to a group of liquid crystals delivering light to a low-intensity or dark pixel region of the LCD display.

For example, in an embodiment described with reference to FIG. 5, light blocked by electrode 510 of the electrochromic material 508 may cause a low-light portion 512 of the light guide plate 308 to receive light of a lesser intensity. Further, changing the amount of light emitted through or from a portion 512 of the light guide plate 308 may impact the amount of light passing through each of the liquid crystals receiving light from such a low light portion 512. Thus, the electrode 510 in an embodiment may be associated in a data record stored in memory of the information handling system with each of the pixels whose liquid crystals receive light emitted from the portion of the light guide plate 308 that is affected by operation of the electrode 510. Once the pixels of a dark pixel region have been identified at block 1004 above, the electrochromic material regional backlight unit dimming control system in an embodiment may access such a data record in memory to identify the electrochromic electrode associated with the pixels within such a dark pixel region.

At block 1008, the identified electrochromic material electrodes may be activated in an embodiment to reduce light delivered to the liquid crystals of the pixels within the low-intensity pixel region. In an embodiment in which the electrochromic material regional backlight unit dimming control system determines at block 1004 the average of the intensity values associated with each of the pixels within a darker pixel region meets a threshold minimum value (e.g. five nits), the electrochromic material electrode associated with that darker pixel region may be activated. As described herein, the electrochromic material regional backlight unit dimming control system in an embodiment may activate a single electrochromic electrode by passing a current across it such that the electrochromic material in contact with it becomes opaque and blocks any undesired light generated by the backlight unit LED or reflected by the reflector layer proximate to the interior of the top of the cover chassis. For example, in an embodiment described with reference to FIG. 6, by activating the electrochromic electrode associated with the darker pixel region 606, the electrochromic material regional backlight unit dimming control system in such an embodiment may thus decrease the amount of light delivered to the liquid crystals associated with each of the pixels within the darker pixel region 606. Consequently, less light may bleed through these liquid crystals, and the pixels in the darker pixel region 606 may emit less light, decreasing the overall black level of the video display 110 and increasing the overall contrast between the peak luminance value and black level of the video display 110. In such a way, the electrochromic material regional backlight unit dimming control system may provide the high contrast capabilities required by the HDR image standards using a cheaper, lighter, smaller system for use in mobile information handling systems having a small form-factor chassis.

The blocks of the flow diagrams of FIGS. 9-10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an electrochromic material regional backlight unit dimming control system comprising:
   a liquid crystal display (LCD) having a plurality of pixels;
   an electrochromic material layer having a plurality of electrodes disposed between an interior surface of a chassis enclosing the information handling system and a transistor-array layer;
   an edge back-light unit comprising a first light guide plate disposed between the electrochromic material layer and the transistor-array layer, a first light emitting diode (LED) array proximate to an outer boundary of the first light guide plate, and a high reflection layer reflecting light emitted from the first LED array away from the interior surface of the chassis and toward the electrochromic material layer;
   a processor executing code instructions of the electrochromic material regional backlight unit dimming control system to:
      define a plurality of pixel regions, wherein each of the plurality of pixel regions comprises a subset of the plurality of pixels of the liquid crystal display;
      identify a low-intensity pixel region within the plurality of regions, comprising a first subset of pixels associated with low intensity values in high dynamic ratio (HDR) image data;
      identify an activated one of the plurality of electrodes of the electrochromic material layer associated in a memory with the low-intensity pixel region; and
      pass current through the activated one of the plurality of electrodes such that a portion of the electrochromic material becomes opaque to a light reflected from the high reflection layer.

2. The information handling system of claim 1, wherein the identification of the low-intensity pixel region comprises a histogram analysis of intensity values associated with each of the plurality of pixels within the HDR image data.

3. The information handling system of claim 1, wherein the electrochromic material layer is disposed within an LCD panel that further comprises the transistor-array layer, an optical film layer, the first LED array, the first light guide plate, and a low-reflection layer.

4. The information handling system of claim 3 further comprising:
a second light guide plate disposed between the electrochromic material layer and the high-reflection layer; and
a second light emitting diode (LED) array proximate to an outer boundary of the second light guide plate, wherein the high-reflection layer reflects light emitted by the second LED array.

5. The information handling system of claim 1, wherein the electrochromic material layer is disposed between the high reflection layer and an LCD panel that further comprises the transistor-array layer, an optical film layer, the first LED array, the light guide plate, and a low-reflectance layer.

6. The information handling system of claim 1, wherein the plurality of pixel regions form a grid of pixel regions across the LCD.

7. The information handling system of claim 1, wherein the electrochromic material comprises a conducting polymer.

8. A method of dimming a region of pixels using an electrochromic material comprising:
defining via a graphics processing unit (GPU) a plurality of pixel regions, wherein each of the plurality of pixel regions comprises a subset of a plurality of pixels of a liquid crystal display;
identifying, via the GPU, a low-intensity pixel region within the plurality of regions comprising a first subset of pixels associated with a low intensity value in high dynamic ratio (HDR) image data;
identifying via the GPU a high-intensity pixel region within the plurality of regions comprising a second subset of pixels associated with a high intensity value in the HDR image data;
identifying via the GPU a first of a plurality of electrodes of an electrochromic material layer associated in a memory with the low-intensity pixel region and a second of the plurality of electrodes associated with the high-intensity pixel region;
wherein the electrochromic material layer is disposed between an interior surface of a chassis enclosing an information handling system and a transistor-array layer;
emitting a first light from a first light emitting diode (LED) array proximate to an outer boundary of a first light guide plate;
wherein the first light is reflected by a high reflection layer away from the interior surface of the chassis and toward the electrochromic material layer;
passing a current through the first of the plurality of electrodes such that a first portion of the electrochromic material becomes opaque to the first light reflected by the high reflection layer, and a second portion of the electrochromic material remains transparent to the first light reflected by the high reflection layer.

9. The method of claim 8, wherein identifying the low-intensity pixel region and the high-intensity pixel region further comprises
performing a histogram analysis of the HDR image data to determine intensity values associated with each of the first subset of pixels in the HDR image data; and
determining an average intensity level for the first subset of pixels by taking an average of intensity value associated with each of the first subset of pixels.

10. The method of claim 8, wherein the electrochromic material layer is disposed within an LCD panel that further comprises the transistor-array layer, an optical film layer, the first LED array, the first light guide plate, and a low-reflection layer.

11. The method of claim 8 further comprising:
emitting a second light from a second light emitting diode (LED) array proximate to an outer boundary of a second light guide plate;
wherein the second light is reflected by the high reflection layer away from the interior surface of the chassis and toward the electrochromic material layer; and
passing a current through the first of the plurality of electrodes such that the first portion of the electrochromic material becomes opaque to the second light reflected by the high reflection layer.

12. The method of claim 8, wherein the electrochromic material layer is disposed between the high reflection layer and an LCD panel that further comprises the transistor-array layer, an optical film layer, the first LED array, the light guide plate, and a low-reflectance layer.

13. The method of claim 8, wherein the plurality of pixels regions form a grid of pixel regions across the LCD.

14. The method of claim 8, wherein one of the pixels within the second subset of pixels is associated in the HDR image data with an intensity value above 300 nits.

15. An information handling system operating an electrochromic material regional backlight unit dimming control system comprising:
a liquid crystal display (LCD) having a plurality of pixels;
an electrochromic material layer having a plurality of electrodes disposed between an interior surface of a chassis enclosing the information handling system and a transistor-array layer;
an edge back-light unit comprising a first light guide plate disposed between the electrochromic material layer and the transistor-array layer, a first light emitting diode (LED) array proximate to an outer boundary of the first light guide plate, and a high reflection layer reflecting a first light emitted from the first LED array away from the interior surface of the chassis and toward the electrochromic material layer;
a second light guide plate disposed between the electrochromic material layer and the high-reflection layer; and
a second light emitting diode (LED) array proximate to an outer boundary of the second light guide plate, wherein the high-reflection layer reflects a second light emitted by the second LED array;
a processor executing code instructions of the electrochromic material regional backlight unit dimming control system to:
define a plurality of pixel regions, wherein each of the plurality of pixel regions comprises a subset of the plurality of pixels of the liquid crystal display;

identify a low-intensity pixel region within the plurality of regions, comprising a first subset of pixels associated with low intensity values in high dynamic ratio (HDR) image data;

identify an activated one of the plurality of electrodes of the electrochromic material layer associated in a memory with the low-intensity pixel region; and pass a current through the activated one of the plurality of electrodes such that a portion of the electrochromic material becomes opaque to the first light and the second light reflected from the high reflection layer.

16. The information handling system of claim 15, wherein the plurality of pixels regions form a grid of pixel regions across the LCD.

17. The information handling system of claim 15, wherein the electrochromic material layer is disposed within an LCD panel that further comprises the transistor-array layer, an optical film layer, the first LED array, the first light guide plate, and a low-reflection layer.

18. The information handling system of claim 15, wherein the electrochromic material layer is disposed between the high reflection layer and an LCD panel that further comprises the transistor-array layer, an optical film layer, the first LED array, the light guide plate, and a low-reflectance layer.

19. The information handling system of claim 15, wherein the electrochromic material comprises a metal oxide.

20. The information handling system of claim 15, wherein the electrochromic material comprises a viologen and titanium dioxide.

* * * * *